US010260284B2

United States Patent
Lockwood et al.

(10) Patent No.: US 10,260,284 B2
(45) Date of Patent: Apr. 16, 2019

(54) LADDER INSTALLATION FOR EQUIPMENT TOWER

(71) Applicants: Siemens Gamesa Renewable Energy, Inc., Orlando, FL (US); Wind Tower Technologies, LLC, Boulder, CO (US)

(72) Inventors: James D. Lockwood, Boulder, CO (US); Matthew J. Chase, Windsor, CO (US); Luis E. Carbonell, Deltona, FL (US)

(73) Assignees: WIND TOWER TECHNOLOGIES, INC., Boulder, CO (US); SIEMENS GAMESA RENEWABLE ENERGY, INC., Orlando, FL (US)

( * ) Notice: Subject to any disclaimer, the term of this patent is extended or adjusted under 35 U.S.C. 154(b) by 0 days.

(21) Appl. No.: 15/753,348

(22) PCT Filed: Aug. 2, 2016

(86) PCT No.: PCT/US2016/045106
§ 371 (c)(1),
(2) Date: Feb. 19, 2018

(87) PCT Pub. No.: WO2017/039915
PCT Pub. Date: Mar. 9, 2017

(65) Prior Publication Data
US 2018/0245402 A1  Aug. 30, 2018

Related U.S. Application Data (60) Provisional application No. 62/212,010, filed on Aug. 31, 2015.

(51) Int. Cl.
*E06C 9/02* (2006.01)
*E04H 12/16* (2006.01)
(Continued)

(52) U.S. Cl.
CPC ............. *E06C 9/02* (2013.01); *E04H 12/12* (2013.01); *E04H 12/16* (2013.01); *E04H 12/342* (2013.01);
(Continued)

(58) Field of Classification Search
CPC . E06C 9/02–9/04; E04H 12/12; E04H 12/342
See application file for complete search history.

(56) References Cited

U.S. PATENT DOCUMENTS

| 261,847 | A | * | 8/1882 | Graff | ......................... E06C 9/08 182/129 |
| 2,615,665 | A | * | 10/1952 | Baxter | ..................... E06C 9/14 182/164 |

(Continued)

FOREIGN PATENT DOCUMENTS

| DE | 202011100364 U1 | * | 1/2012 | ............... E06C 7/12 |
| DE | 102012002545 A1 | * | 8/2013 | ............. E01D 15/24 |

(Continued)

OTHER PUBLICATIONS

PCT International Search Report and Written Opinion of International Searching Authority dated Oct. 28, 2016 corresponding to PCT International Application No. PCT/US2016/045106 filed Aug. 2, 2016.

*Primary Examiner* — Babajide A Demuren (57) ABSTRACT

An equipment tower having a ladder formed of a plurality of ladder segments each joined to a respective tower segment by a pivotal connection prior to the tower segments being stacked during erection of the tower. The pivotal connection provides a degree of freedom of movement which facilitates the interconnection of adjoining ends of the ladder segments after stacking of the tower segments. Additional accommodation of as-built spacing of the adjacent ends of the ladder segments may be provided by a connecting segment. The (Continued)

pivotal connection may be a rod inserted through a rung of the ladder and supported by a support assembly attached to the tower segment.

11 Claims, 5 Drawing Sheets

(51) Int. Cl.
*E04H 12/34* (2006.01)
*F03D 13/20* (2016.01)
*F03D 13/10* (2016.01)
*F03D 80/80* (2016.01)
*E06C 7/18* (2006.01)
*E06C 7/50* (2006.01)
*E04H 12/12* (2006.01)

(52) U.S. Cl.
CPC .............. *E06C 7/187* (2013.01); *E06C 7/505* (2013.01); *F03D 13/10* (2016.05); *F03D 13/20* (2016.05); *F03D 80/88* (2016.05); *Y02E 10/728* (2013.01)

(56) References Cited

U.S. PATENT DOCUMENTS

| | | | | |
|---|---|---|---|---|
| 3,042,143 | A * | 7/1962 | Silen | E06C 1/36 182/163 |
| 4,386,487 | A * | 6/1983 | Scott | E06C 9/02 182/93 |
| 5,022,491 | A * | 6/1991 | Gill | E06C 9/14 182/163 |
| 5,931,258 | A * | 8/1999 | Lorentz | E06C 9/02 182/106 |
| 6,467,233 | B1 * | 10/2002 | Maliszewski | E04H 12/085 52/831 |
| 6,782,667 | B2 | 8/2004 | Henderson | |
| 8,935,889 | B2 * | 1/2015 | Samuelsen | E04H 12/28 52/40 |
| 2003/0147753 | A1 * | 8/2003 | Ollgaard | E04H 12/085 416/244 A |
| 2010/0154351 | A1 * | 6/2010 | Messenburg | E04H 12/08 52/745.17 |
| 2013/0034450 | A1 * | 2/2013 | Samuelsen | E04H 12/28 416/244 R |
| 2013/0299277 | A1 * | 11/2013 | Kyatham | E06C 9/02 182/129 |
| 2015/0096240 | A1 * | 4/2015 | Arlab N Gabeiras | E04H 12/342 52/40 |
| 2015/0292263 | A1 * | 10/2015 | Hierl | E04G 1/36 182/128 |
| 2015/0361679 | A1 * | 12/2015 | Kent | E04G 3/20 52/40 |
| 2017/0101823 | A1 * | 4/2017 | Yenser | E06C 1/34 |

FOREIGN PATENT DOCUMENTS

| | | | | |
|---|---|---|---|---|
| DE | 102012109860 A1 | 4/2014 | | |
| DE | 202014001178 U1 * | 5/2014 | ............ | E01D 15/24 |
| DE | 102015002788 A1 * | 9/2016 | ............ | E02B 17/003 |
| WO | WO-2009082771 A1 * | 7/2009 | ............ | E06C 7/185 |
| WO | 2015028400 A1 | 3/2015 | | |

* cited by examiner

LADDER INSTALLATION FOR EQUIPMENT TOWER

This application claims benefit of the 31 Aug. 2015 filing date of U.S. provisional patent application No. 62/212,010 which is incorporated by reference herein.

FIELD OF THE INVENTION

This invention relates generally to the field of equipment towers; and more particularly, to a ladder and method of installing a ladder in an equipment tower; and in specific embodiments, to a ladder and method of installing a ladder in a precast concrete equipment tower.

BACKGROUND OF THE INVENTION

It is known to form equipment towers by stacking precast concrete tower segments to a desired height. The segments may be identical, or they may have reduced diameters over the height of the tower. U.S. Pat. No. 9,175,670 B2 issued on Nov. 3, 2015, to Lockwood, et al. describes a post-tensioned concrete tower formed by stacking precast concrete annular segments on a foundation, wherein the diameter of the respective segments varies in stages over the height of the tower, with a group of segments having one diameter being separated from a group of segments having a different diameter by a transition segment. This tower geometry simplifies the formwork used to precast the segments when compared to tower designs wherein each segment is different as the tower varies gradually in diameter over the height of the tower.

It is also known to provide a ladder in the interior of an equipment tower to facilitate access from ground level to equipment mounted at the top of the tower, for example a wind turbine installed on a nacelle of the tower. Such ladders are typically installed in the tower after the tower has been erected, or they may be installed in stages as the tower is erected.

U.S. Pat. No. 6,782,667 B2 issued on Aug. 31, 2004 to Henderson describes a tower design utilizing telescoping tower sections that are nested within each other while in a horizontal position and which are then extended to a full height after being rotated to a vertical orientation. Henderson also describes a nested telescoping ladder design which has sections corresponding to the nested tower sections which are extended to a full length as the tower sections are extended. The ladder is uniquely designed for use with the telescoping tower sections, and a complicated arrangement of pivot members, slotted and solid brackets, folding brackets, removable plates and stop blocks are required to accomplish its extension and support functions.

Accordingly, further improvements in equipment tower ladder design and installation are desired.

BRIEF DESCRIPTION OF THE DRAWINGS

The present invention is explained in the following description in view of the drawings that show.

DETAILED DESCRIPTION OF THE INVENTION

The present inventors have recognized that the installation of a ladder into the interior of an equipment tower can be a time consuming and risky operation. Traditional installation techniques often require the use of a construction crane to deliver the ladder into the annular interior of the tower from above and to support the ladder until it is secured to the tower wall surface. This places the ladder installation on the critical path of the overall tower construction schedule. Accordingly, the present inventors have developed a new ladder design and installation method which eliminates the need for use of the construction crane, and which allows the ladder installation to proceed off of the tower construction critical path.

Figure 1:
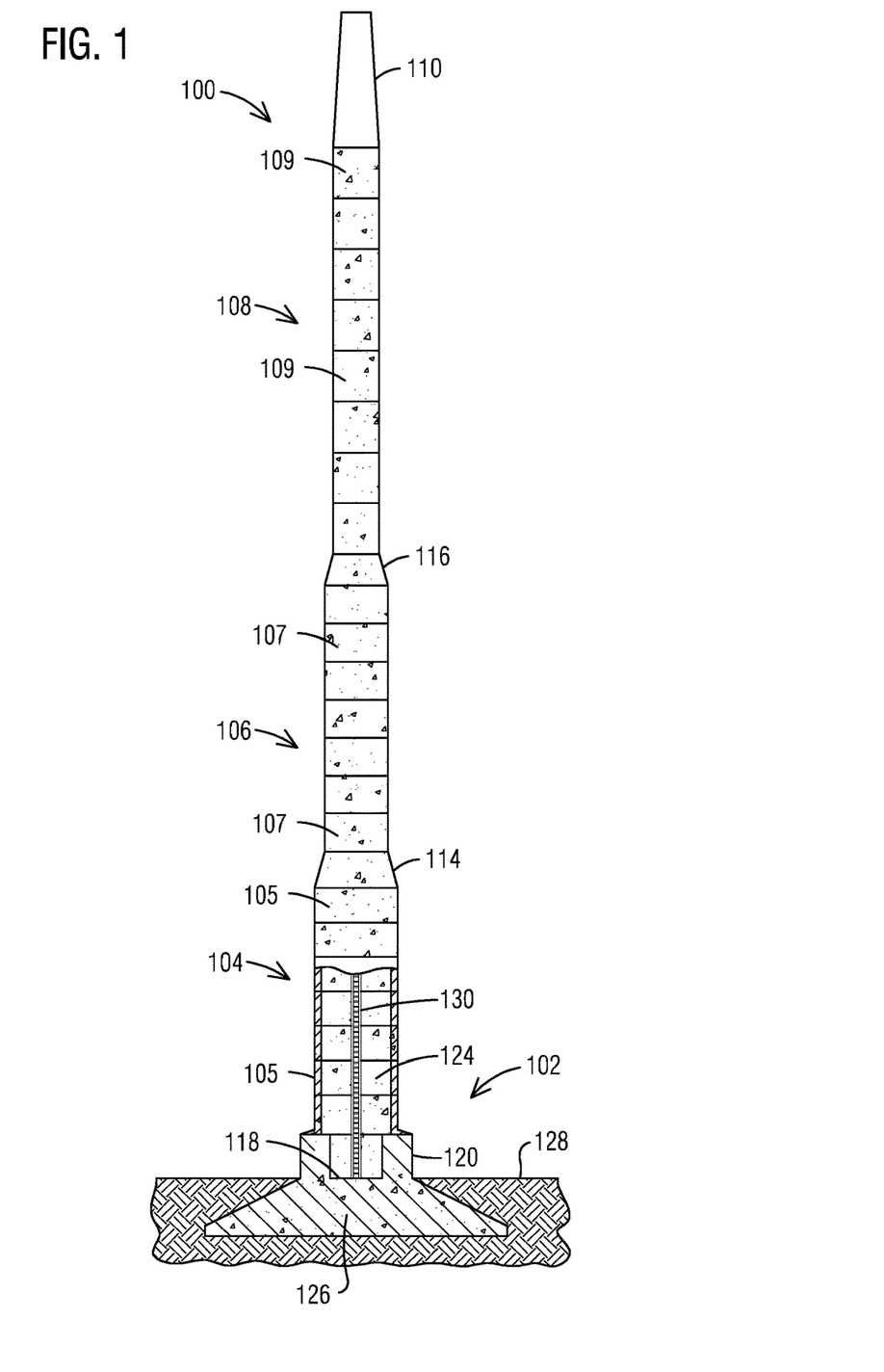
FIG. 1 is an equipment tower according to an embodiment of the present invention.

FIG. 1 illustrates an exemplary equipment tower 100 in accordance with an embodiment of the present invention. The tower 100 is a wind turbine tower, which supports various types of equipment. Such equipment may be affixed at or proximate the top of the equipment tower 100 or affixed at desired locations along the length of the equipment tower 100 depending on a particular application. Tower 100 may include a foundation 102, a bottom tower portion 104, a middle tower portion 106, a top tower portion 108 and a steel tip adapter 110. The steel tip adapter 110 may be used to support the nacelle of a wind turbine (not shown). Each tower portion 104, 106, 108 may be formed with a plurality of tower segments 105, 107, 109, respectively, that may be formed of precast concrete. Each tower segment 105 may have a first constant diameter and a first height, each tower segment 107 may have a second constant diameter and a second height, and each tower segment 109 may have a third constant diameter and a third height. As illustrated in FIG. 1, the first constant diameter of tower segments 105 may be greater than the second constant diameter of tower segments 107, which in turn are greater than the third constant diameter of tower segments 109, thereby forming an equipment tower 100 that decreases in diameter from the bottom tower portion 104 to the top tower portion 108. Transition segments 114 and 116 are positioned between appropriate tower portions 104, 106, 108 to accommodate the progressive change in the diameter of tower segments 105, 107, 109 from the bottom to the top of equipment tower 100.

FIG. 1 further illustrates foundation 102 that may include a platform 118 and a subsection 126 extending below ground level 128. A pedestal or plinth 120 extends from platform 118. The tower 100 and has an inside surface that defines an internal chamber 124. A ladder 130 is installed within the internal chamber 124 to provide access to upper sections of the tower 100 from the platform 118. In other embodiments, the ladder may extend upward from a structure which rests on the platform 118 or from an intermediate height within the tower, and it may extend upward to any desired height in the tower. The design and installation of ladder 130 is discussed more fully below.

Figure 2:
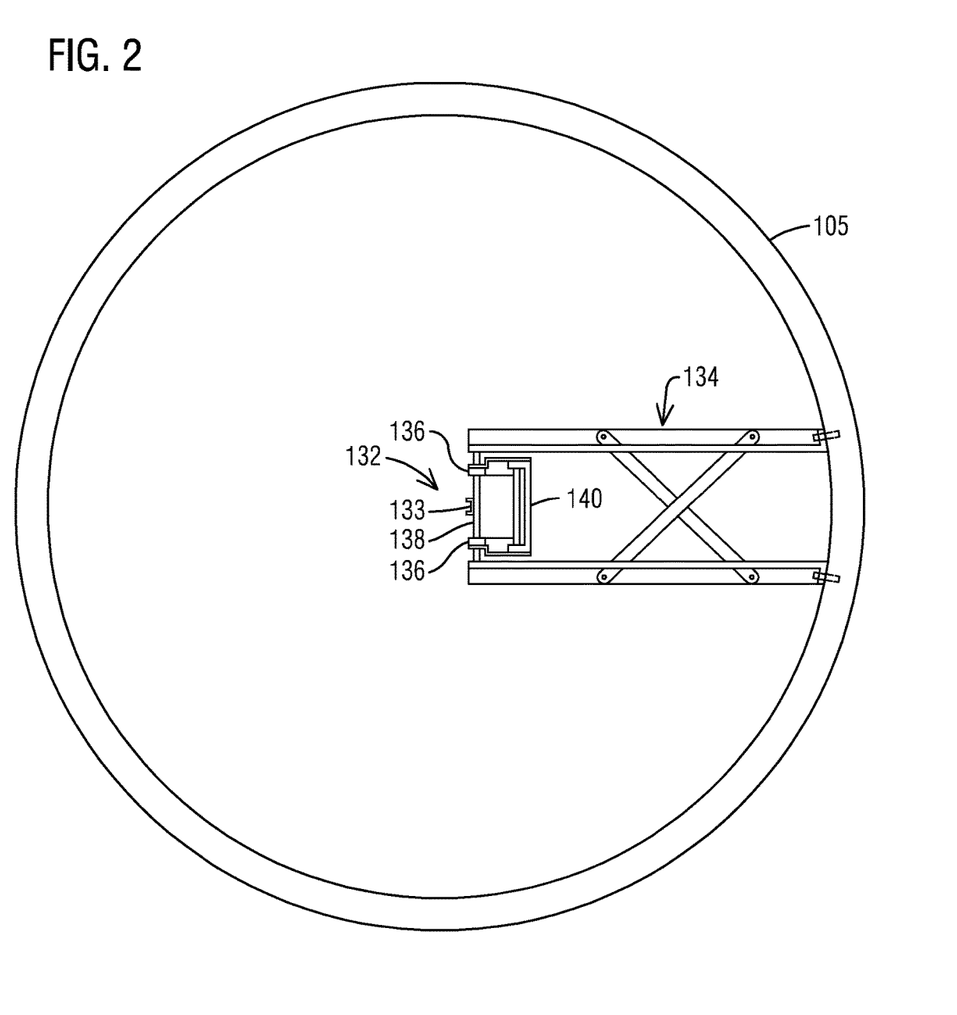
FIG. 2 is a top view of a ladder segment installed in a tower segment prior to erection of the tower.

FIG. 2 is a top view of tower segment 105 of FIG. 1. In this view, a ladder segment 132 has been attached to the tower segment 105 after fabrication of the tower segment 105 but prior to the erection of the tower 100. Tower segment 105 partially defines the internal chamber 124 of the completed tower 100. The ladder segment 132 forms part of ladder 130 after it has been joined to other ladder segments of the tower as described more fully below. Ladder segment 132 is attached to and is supported from the tower segment 105 by a support assembly 134 which is also described in more detail below. Ladder segment 132 includes two rails 136 connected to opposed sides of a plurality of parallel rungs 138. As known in the art, a person ascends the ladder by sequentially standing on ascending ones of the rungs 138 while holding onto the rungs 138 and/or rails 136. An optional cable tray or cable ladder segment 140 is attached to the ladder segment 132 for supporting electrical and signal cables (not shown) that are routed along the height of the tower 100.

Figure 3:
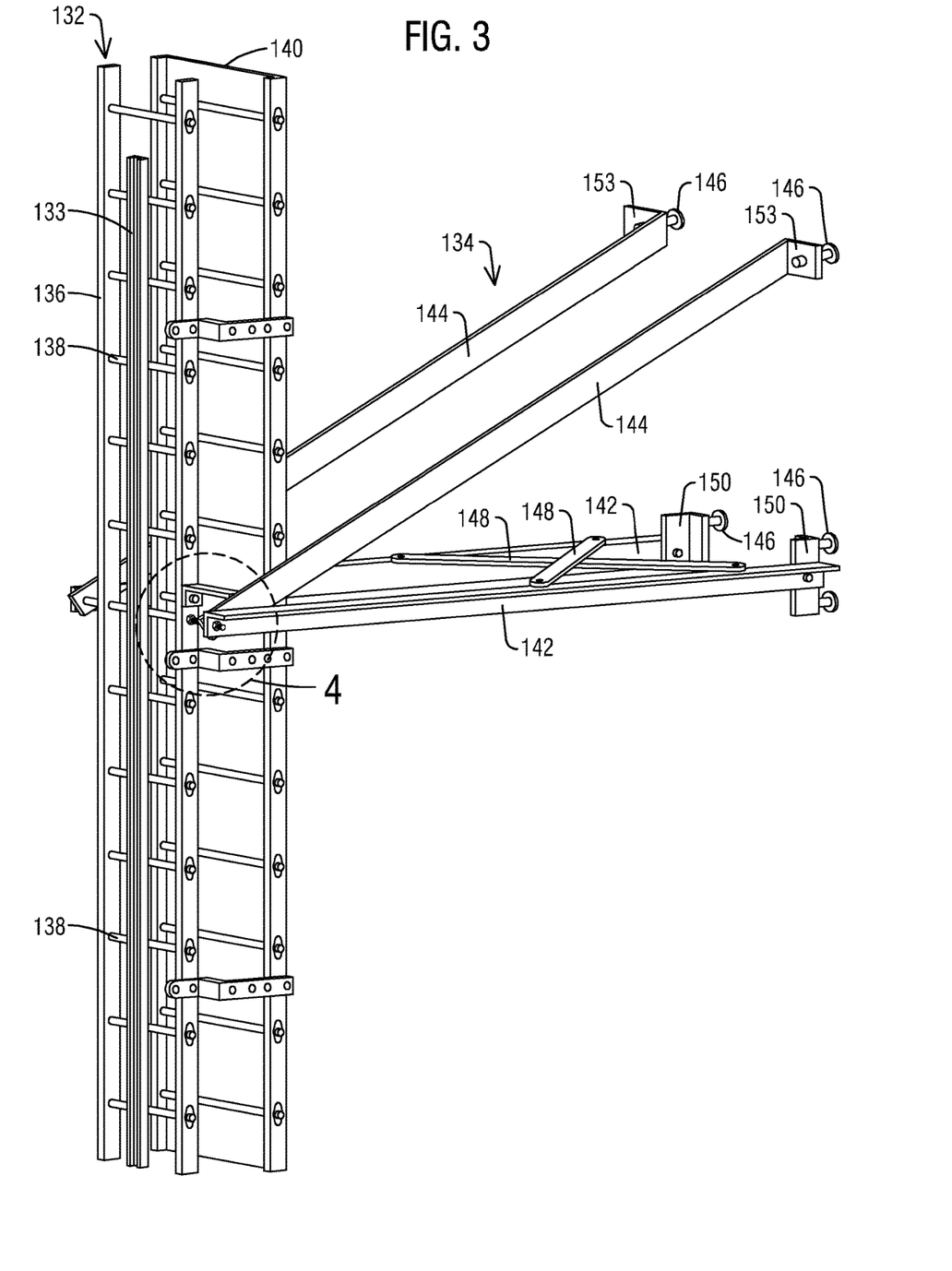
FIG. 3 is a perspective view of a ladder segment and support assembly.

FIG. 3 is a partial perspective view of the ladder segment 132 and support assembly 134 of FIG. 2, more clearly illustrating design details of those structures. Ladder segment 132 includes two rails 136 and interconnecting rungs 138. A safety rail 133 runs between the rails 136 for connection of a climber's safety harness support system. Support assembly 134 includes two horizontal support beams 142 and two oblique support beams 144, with respective left and right horizontal and oblique support beams 142, 144 being connected to respective left and right rails 136. The support beams 142, 144 are attached to the wall of the tower segment 105 through anchors 146. Anchors 146 may be any known design, such as wall anchors provided by Dayton Superior Corporation. The horizontal support beams 142 are illustrated as L-beams and the oblique support beams 144 are illustrated as flat plates, although other designs can be used in other embodiments. Horizontal stiffness is provided in this design primarily by the horizontal portions of horizontal support beams 142, and two cross brace beams 148 are also provided to increase that stiffness in order to minimize sway as a person ascends or descends the ladder 132. Horizontal support beams 142 are attached to the tower segment 105 through L-brackets 150, whereas the oblique support beams 144 are connected directly to the tower segment 105 through flanged ends 153 formed by bending distal ends of the beams 144. Other methods of connecting the support assembly 134 to the tower segment 105 may be used in other embodiments.

Support assembly 134 functions not only to support the ladder segment 132 from the tower segment 105, but also to do so at a predetermined distance from the wall of the tower segment 105. One may appreciate that in a tower 100 that varies in diameter over its height, it is necessary to use different sizes of support assemblies for different diameter sections of the tower if it is desired to keep the ladder 130 straight, such as at the vertical centerline of the tower. Alternatively, a landing or work platform may be used at one or more intermediate heights of the tower to accommodate a shift of the horizontal position of different ladder sections.

Figure 4:
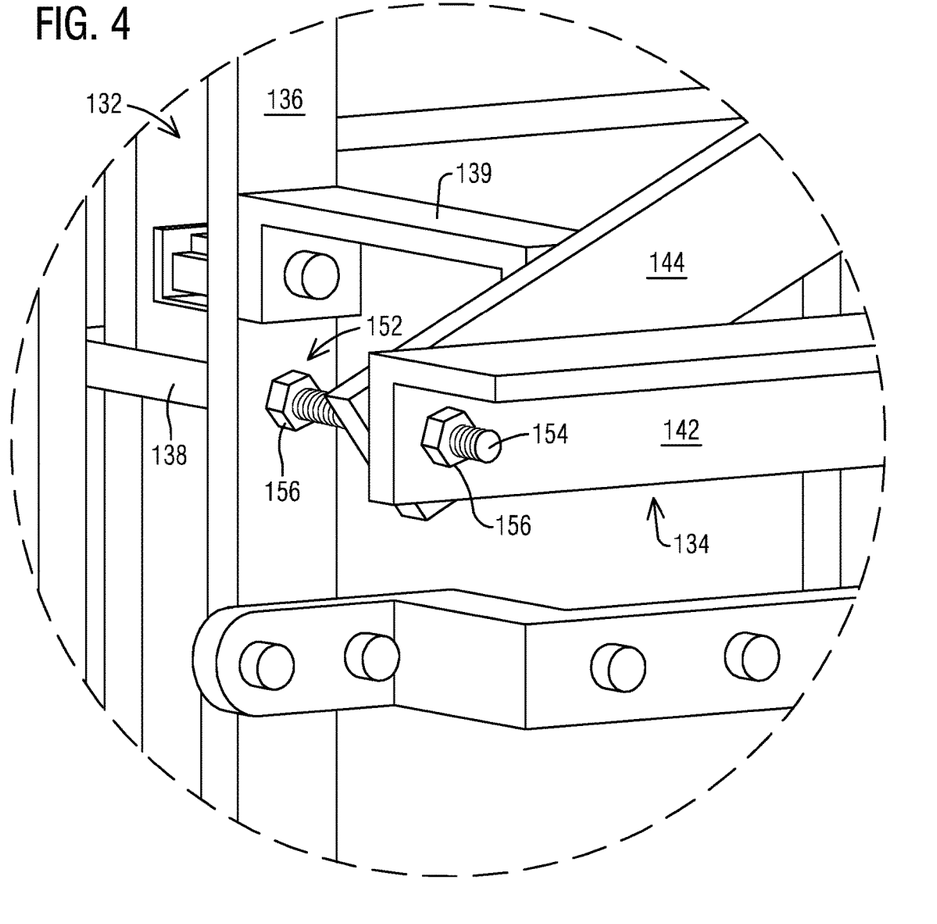
FIG. 4 is a closer view of the connection between the ladder segment and support assembly of FIG. 3.

FIG. 4 is a magnified illustration of a pivotal connection 152 between the ladder segment 132 and support assembly 134 of FIG. 3. The term "pivotal connection" as used herein refers to an interconnection which allows for some relative movement between the ladder segment and the support assembly after being affixed. The relative movement may typically include rotation of the ladder segment about an axis passing through the pivotal connection, but other directions of freedom of movement may be envisioned in other embodiments. To facilitate the interconnection of two adjoining ladder segments, at least one of the ladder segments and preferably both of the ladder segments should be supported by a pivotal connection.

For the pivotal connection 152 illustrated in FIG. 4, a rod 154 passes through holes formed in the horizontal support beams 142 and oblique support beams 144 on both sides of ladder segment 132. The rod 154 also passes through holes formed in both rails 136 of the ladder segment 132 and through a hollow center of one of the rungs 138'. The rod 154 may be threaded to engage with nuts 156 which hold the ladder segment 132 and support assembly 134 in spaced engagement on the rod 154 while providing a degree of relative rotational movement about the longitudinal axis of the rod 154. In accordance with an aspect of the invention, the pivotal connection 152 is used to attach the ladder segment 132 to the tower segment 105 (via the support assembly 134) after fabrication of the tower segment 105 but before the tower segment 105 is lifted into position during erection of the tower 100. In this manner, the ladder segment 132 is passively carried into position during the lifting and placement of the tower segment 105 without any separate critical path step in the construction schedule. Adjacent ladder segments attached to the tower segments adjoining tower segment 105 in the tower 100 are then connected to ladder segment 132, eventually forming continuous ladder 130. The relative movement allowed between ladder segment 132 and tower segment 105 by the pivotal connection 152 provides a degree of spatial adjustment effective to facilitate the connecting of the respective ends of the adjacent ladder segments. Adjacent cable tray segments 140 may also be mechanically joined or left unjoined.

Pivotal connection 152 provides a degree of rotational freedom about the axis of the rod 154, and it also provides a degree of horizontal movement by adjustment of the location of nuts 156. Connection 152 may also provide a small amount of vertical movement depending upon the gap between the diameter of the rod 154 and the inside diameter of rail 138', however, such gap may typically be kept small (e.g. 1-2 mm). Vertical adjustment is more conveniently accommodated by the interconnection between adjacent ladder segment ends, as described more fully below. Other embodiments of pivotal connections may be used, such as a hook, a cable, a tongue in groove arrangement, and/or a slotted connection, as long as the connection supports the ladder segment onto the tower segment with sufficient accuracy to facilitate the interconnection of the adjacent ladder segments, while at the same time providing a degree of relative movement between the ladder segment and the tower segment to facilitate that interconnection. Should a pivotal connection design be used which does not have the required load carrying capacity for the completed continuous ladder 130, one or more secondary connectors 139 may be added to connect the continuous ladder 130 to the appropriate support assemblies 134.

Figure 5:
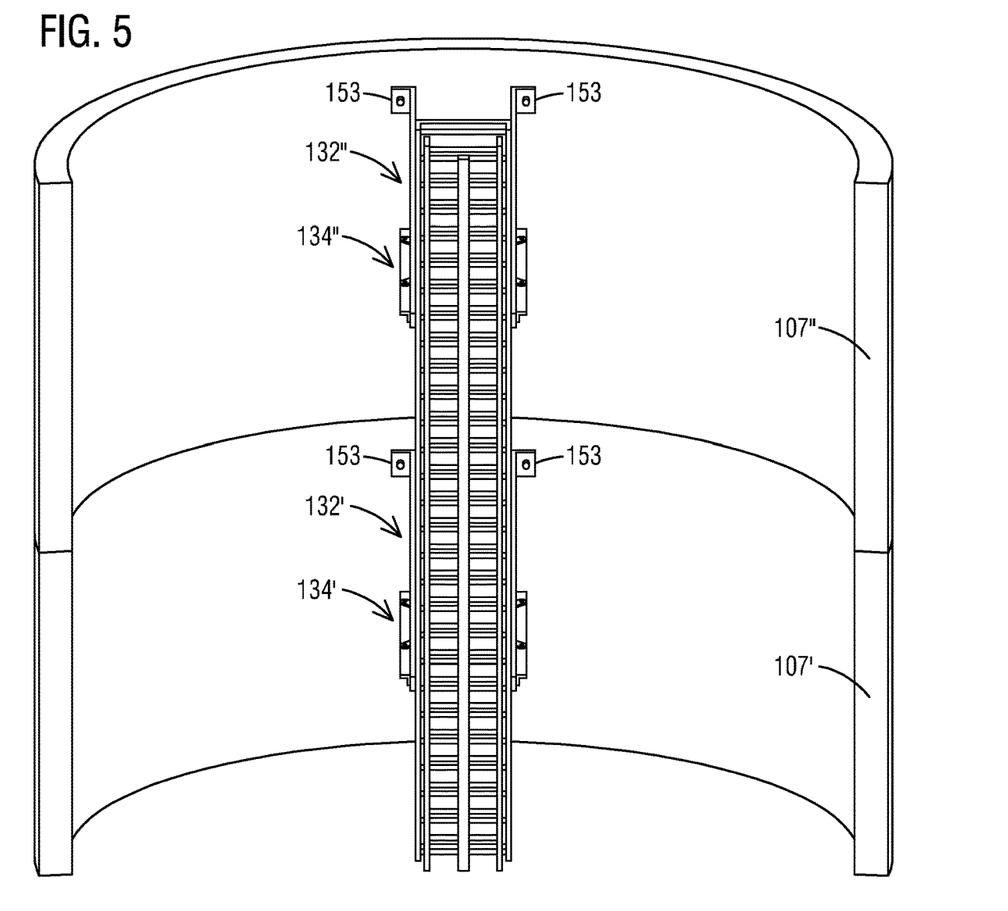
FIG. 5 is a partial elevational view of two ladder segments joined together during erection of the tower segments.
Figure 6:
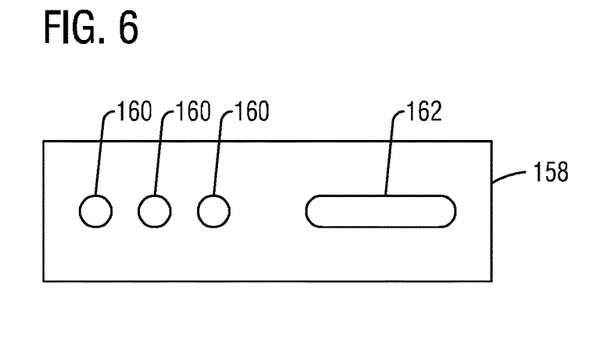
FIG. 6 is a plan view of a connecting segment for joining adjacent ladder segments.

FIG. 5 is a partial elevational view of two ladder segments 132', 132" joined together after erection of the tower 100. Ladder segment 132' is attached to lower tower segment 107' by support assembly 134', and ladder segment 132" is attached to upper tower segment 107" by support assembly 134". When the two tower segments 107', 107" are joined together during erection of the tower 100, the respective ends of ladder segments 132', 132" are placed in proximate alignment. The term "proximate alignment" as used herein means that the facing ends of the adjacent ladder segments 132', 132" are brought near enough to each other to be connected together either directly or with some type of connecting segment at a later step in the construction schedule. One type of connecting segment 158 is illustrated in FIG. 6 as a simple rectangular plate having a plurality of holes 160 and/or slots 162 formed therein to accept fasteners such as bolts at any of several different locations. The connecting segment 158 is sized to interface with the rails 136 of the ladder segments (one per rail), with a plurality of holes 160 and/or slots 162 to accommodate a range of as-built spacing of the respective adjacent ends of ladder segments 132', 132", thereby mechanically connecting the ladder segments 132', 132" together. In other embodiments, a work platform (not shown) may be positioned proximate the juncture of adjacent ladder segment ends, and the work platform structure may function as at least part of the connecting segment.

Figure 7:
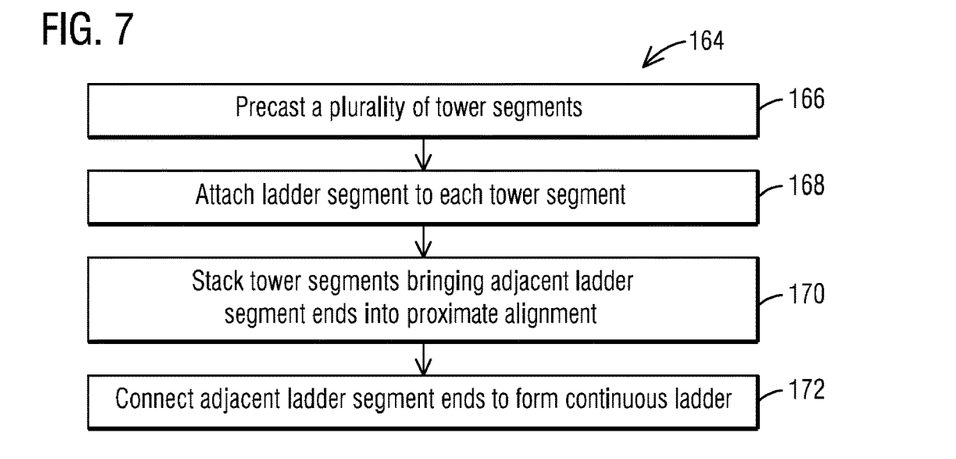
FIG. 7 illustrates a method of installing a ladder into an equipment tower.

FIG. 7 is a block diagram illustrating steps in a method 164 of installing a ladder 130 in an equipment tower 100. A plurality of tower segments are formed at step 166, such as by precasting concrete segments or forming metal segments. A respective ladder segment is then attached to each tower segment at step 168. The ladder segments may be attached at anchors which are included in the concrete casting mold for concrete segments, or by welding for metal segments, or by any other desired method. The tower is then erected by stacking the tower segments together at step 170, bringing adjacent ladder segment ends into proximate alignment. The adjacent ladder ends are then connected together at step 172 to form a continuous ladder 130.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method comprising:
 precasting a plurality of concrete tower segments;
 attaching a respective ladder segment to each tower segment;
 stacking the tower segments together to form an equipment tower; and
 joining respective ends of adjoining ladder segments of the equipment tower together to form a continuous ladder,
 wherein the step of attaching a respective ladder segment to each tower segment further comprises:
 attaching a support assembly to each tower segment; and
 passing a rod of each support assembly through a rung of the respective ladder segment.

2. The method of claim 1, wherein the support assembly comprises:
 a horizontal support beam attached to each rail of the ladder segment;
 an oblique support beam attached to each rail of the ladder segment; and
 the rod passing through holes formed in the horizontal and oblique support beams.

3. The method of claim 1, comprising:
 precasting a plurality of concrete tower segments;
 attaching a respective ladder segment to each tower segment;
 stacking the tower segments together to form an equipment tower; and
 joining respective ends of adjoining ladder segments of the equipment tower together to form a continuous ladder, wherein the step of joining respective ends of adjoining ladder segments together comprises attaching the respective ends with a connecting segment comprising a plurality of holes or a slot spaced to accommodate a range of as-built spacing of the respective ends.

4. The method of claim 1 comprising:
 precasting a plurality of concrete tower segments;
 attaching a respective ladder segment to each tower segment;
 stacking the tower segments together to form an equipment tower;
 joining respective ends of adjoining ladder segments of the equipment tower together to form a continuous ladder; and
 attaching a respective cable tray segment to each tower segment along with the respective ladder segment.

5. A method comprising:
 attaching a respective ladder segment to each of a plurality of tower segments;
 joining the tower segments together when erecting an equipment tower with respective ends of adjacent ladder segments in proximate alignment;
 joining the respective ends of the adjacent ladder segments together to form a continuous ladder,
 attaching at least one of the ladder segments to its respective tower segment with a pivotal connection providing a degree of relative movement between the at least one ladder segment and its respective tower segment, the pivotal connection effective to facilitate the joining of the respective ends of the adjacent ladder segments together; and
 attaching the at least one ladder segment to its respective tower segment with a secondary connector after the step of joining the respective ends of the adjacent ladder segments together.

6. A method comprising:
 attaching a respective ladder segment to each of a plurality of tower segments;
 joining the tower segments together when erecting an equipment tower with respective ends of adjacent ladder segments in proximate alignment;
 joining the respective ends of the adjacent ladder segments together to form a continuous ladder; and
 attaching at least one of the ladder segments to its respective tower segment by inserting a rodsupported from the respective tower segment through a rung of the at least one ladder segment.

7. An equipment tower comprising:
 an upper tower segment and a lower tower segment;
 an upper ladder segment pivotally attached to the upper tower segment and a lower ladder segment pivotally attached to the lower tower segment; and
 a connecting segment attaching a top end of the lower ladder segment to a bottom end of the upper ladder segment;
 a respective support assembly attached to each respective tower segment; and
 a rod of each respective support assembly passing through a rung of the respective ladder segment of the respective tower segment.

8. The equipment tower of claim 7, wherein each respective support assembly comprises:
 a first horizontal support beam and a first oblique support beamattached to a first rail of the respective ladder segment;
 a second horizontal support beam and a second oblique support beam attached to a second rail of the respective ladder segment; and a cross brace beam connected between the first and second horizontal support beams.

9. The method of claim 1,
pivoting the support assembly during the attaching the support assembly to each tower segment.

10. The method of claim 9,
wherein the attaching the support assembly a respective tower segment is prior to eretion of the tower.

11. The method of claim 1,
wherein the attaching the support assembly a respective tower segment is prior to erection of the tower.

\* \* \* \* \*